(12) United States Patent
Kim et al.

(10) Patent No.: US 10,708,102 B2
(45) Date of Patent: Jul. 7, 2020

(54) SIMULTANEOUS WIRELESS INFORMATION AND POWER TRANSMISSION METHOD, AND TRANSMISSION APPARATUS AND RECEPTION APPARATUS USING THE SAME

(71) Applicant: Research & Business Foundation Sungkyunkwan University, Suwon-si (KR)

(72) Inventors: Dong In Kim, Seongnam-si (KR); Jong Ho Moon, Suwon-si (KR); Jong Jin Park, Suwon-si (KR); Kang Yoon Lee, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 86 days.

(21) Appl. No.: 15/399,905

(22) Filed: Jan. 6, 2017

(65) Prior Publication Data
US 2018/0026820 A1 Jan. 25, 2018

(30) Foreign Application Priority Data
Jul. 20, 2016 (KR) .................. 10-2016-0092158

(51) Int. Cl.
| | | |
|---|---|---|
| *H04L 27/26* | (2006.01) | |
| *H02J 50/20* | (2016.01) | |
| *H04L 27/02* | (2006.01) | |
| *H04L 27/30* | (2006.01) | |
| *H02J 7/02* | (2016.01) | |

(52) U.S. Cl.
CPC .......... *H04L 27/2614* (2013.01); *H02J 7/025* (2013.01); *H02J 50/20* (2016.02); *H04L 27/02* (2013.01); *H04L 27/30* (2013.01)

(58) Field of Classification Search
CPC .............................. H04L 27/2614; H02J 50/20
USPC ................... 375/256, 259; 370/330; 398/186
See application file for complete search history.

(56) References Cited

U.S. PATENT DOCUMENTS

| | | | |
|---|---|---|---|
| 9,420,546 B2* | 8/2016 | Huang .................. | H04W 52/18 |
| 9,824,815 B2* | 11/2017 | Leabman ................ | H01F 38/14 |
| 9,864,882 B1* | 1/2018 | Geist .................. | G06K 7/10158 |
| 2011/0144573 A1* | 6/2011 | Rofougaran ........... | A61B 5/411 |
| | | | 604/66 |
| 2015/0147069 A1* | 5/2015 | Brandt-Pearce .... | H04L 25/4902 |
| | | | 398/186 |

(Continued)

OTHER PUBLICATIONS

Rui Zhang, et al., "MIMO Broadcasting for Simultaneous Wireless Information and Power Transfer," *Proceedings of the IEEE Transactions on Wireless Communications*, vol. 12, Issue 5, May 2013, pp. 1-29.

(Continued)

*Primary Examiner* — Fitwi Y Hailegiorgis
(74) *Attorney, Agent, or Firm* — NSIP Law

(57) ABSTRACT

A simultaneous wireless information and power transmission method includes: transmitting an energy transfer signal comprising a peak-to-average power ratio (PAPR) corresponding to information to be transmitted at a first side; measuring the PAPR by receiving the energy transfer signal at a second side; and recovering the information from the measured PAPR at the second side.

25 Claims, 7 Drawing Sheets

(56) References Cited

U.S. PATENT DOCUMENTS

| | | | |
|---|---|---|---|
| 2015/0257167 A1* | 9/2015 | Chen ....................... | H04W 4/70 370/330 |
| 2016/0080034 A1* | 3/2016 | Corum ................... | G01S 19/08 375/256 |
| 2017/0288734 A1* | 10/2017 | Zhou .................... | H04B 5/0037 |

OTHER PUBLICATIONS

Korean Office Action dated Feb. 6, 2018, in corresponding Korean Application No. 10-2016-0092158 (2 pages, in Korean).

* cited by examiner

SIMULTANEOUS WIRELESS INFORMATION AND POWER TRANSMISSION METHOD, AND TRANSMISSION APPARATUS AND RECEPTION APPARATUS USING THE SAME

CROSS-REFERENCE TO RELATED APPLICATIONS

This application claims the benefit under 35 USC 119(a) of Korean Patent Application No. 10-2016-0092158, filed on Jul. 20, 2016 in the Korean Intellectual Property Office, the entire disclosure of which is incorporated herein by reference for all purposes.

BACKGROUND

1. Field

The following description relates to a simultaneous wireless information and power transmission method, and a transmission apparatus and a reception apparatus using a simultaneous wireless information and power transmission method.

2. Description of Related Art

Studies regarding simultaneous wireless information and power transmission technology are continuing. Simultaneous wireless information and power transmission technology is effective when supplying power to a device having low power consumption, such as an Internet-of-Things (IoT) device, a wearable device, and a bio sensor.

Simultaneous wireless information and power transmission (SWIPT), which is a conventional technology of simultaneously wirelessly transmitting information and power, is classified into a time switching (TS) method of simultaneously receiving information and power by switching a time, and a power splitting (PS) method of providing one portion of a signal to a circuit that collects power and providing another portion of the signal to a circuit that receives information.

The TS method is relatively easy to implement as a circuit, but has a disadvantage in that performance of the TS method is decreased by dividing a time resource, which is a limited resource. The PS method is relatively better in performance but is not easy to implement as a circuit. SWIPT technology is basically a method based on orthogonality of a channel and has a limitation in effective usage of resources when simultaneously transmitting information and power according to division of time and power resources.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a simultaneous wireless information and power transmission method includes: transmitting an energy transfer signal including a peak-to-average power ratio (PAPR) corresponding to information to be transmitted at a first side; measuring the PAPR by receiving the energy transfer signal at a second side; and recovering the information from the measured PAPR at the second side.

In the transmitting of the energy transfer signal, the energy transfer signal may be a signal in which N (N=1, 2, . . . , Q) tones having different frequencies are superimposed. The information to be transmitted includes $\log_2 Q$-bits of digital data (Q, N: natural numbers).

The simultaneous wireless information and power transmission method may further include periodically or aperiodically: transmitting a pilot signal at the second side; receiving the pilot signal and estimating a channel status from the received pilot signal at the first side; and calculating an amplitude and a phase of the energy transfer signal from the estimated channel status at the first side.

The calculating of the amplitude and the phase of the energy transfer signal from the estimated channel status at the first side further may include aligning phases of tones included by being superimposed in the energy transfer signal received at the second side.

The calculating of the amplitude and the phase of the energy transfer signal from the estimated channel status at the first side may further include matching an amplitude and the phase by performing calculation according to $$S_{n,m}\exp(j\varphi_{n,m}) = \sqrt{2P}\,\frac{h^*_{n,m}}{\sqrt{\sum_{m=1}^{M}\sum_{n=0}^{N}|h_{n,m}|^2}},$$

wherein j is an imaginary unit, h* is a complex conjugate of a channel gain, P is a transmission power, n is an $n^{th}$ tone, m is an $m^{th}$ antenna, S is an amplitude, and $\varphi$ is a phase.

The second side may be any one of a wearable device, an Internet of things (IoT) device, and a bio sensor.

The simultaneous wireless information and power transmission method may further include charging an energy storage device by rectifying the energy transfer signal received at the second side.

The transmitting of the energy transfer signal may further include transmitting the energy transfer signal for each group among a number of groups, wherein the energy transfer signal for each group includes a signal including tones having different frequencies and formed by being linearly superimposed with each other.

The measuring of the PAPR may further include receiving the energy transfer signal for each group, splitting the energy transfer signal for each group according to an allocated channel sub-band, and measuring the PAPR for the energy transfer signal of each group.

The transmitting of the energy transfer signal may be performed by transmitting the energy transfer signal for each group among a number of groups. The energy transfer signal for each group may include a signal formed by superimposing a number of tones having different frequencies allocated to different wireless sensor groups.

The measuring of the PAPR may be performed by receiving the energy transfer signal for each group. The energy transfer signal for each group may be split according to a sub-band allocated to different wireless sensor groups. The PAPR for the energy transfer signal of the split group may be measured.

The transmitting of the energy transfer signal may further include transmitting an I/O modulated signal.

The simultaneous wireless information and power transmission method may further include recovering information from the I/O modulated signal by: obtaining a number of different frequencies included by being superimposed in the energy transfer signal transmitted by the first side from the measured PAPR at the second side; superimposing tones having different frequencies corresponding to the number of different frequencies; and obtaining a difference signal corresponding to a difference between the received signal and a signal obtained by the superimposing of the tones having the different frequencies corresponding to the number of different frequencies.

In another general aspect, a simultaneous wireless information and power transmission apparatus includes: a signal generator configured to generate an energy transfer signal; a modulator configured to control the signal generator such that the energy transfer signal has a peak-to-average power ratio (PAPR) corresponding to information to be transmitted; and an antenna configured to radiate the energy transfer signal.

The signal generator may be configured to form the energy transfer signal by linearly superimposing N (N=1, 2, ..., Q) tones having different frequencies to have the PAPR corresponding to information. The information to be transmitted may include $\log_2 Q$ bits of digital data (Q, N: natural numbers).

The simultaneous wireless information and power transmission apparatus may further include a matcher configured to match phases of multi-tones of the energy transfer signal such that phases of the energy transfer signal received by a reception apparatus are aligned.

The simultaneous wireless information and power transmission apparatus may further include a matcher configured to select a sub-band corresponding to a frequency-flat channel (FFC) among a number of sub-bands through which the energy transfer signal passes, and to perform amplitude matching such that an amplitude of the received energy transfer signal in the selected sub-band is large in comparison to an amplitude of the received energy transfer signal in an unselected sub-band.

In another general aspect, a simultaneous wireless information and power reception apparatus includes: an antenna configured to receive an energy transfer signal; a rectifier configured to acquire an energy transfer signal output from the antenna, rectify the energy transfer signal output from the antenna, and output the rectified energy transfer signal; an energy storage device configured to be charged by a signal output by the rectifier; and a demodulator configured to measure a peak-to-average power ratio (PAPR) of the rectified energy transfer signal and demodulate the information corresponding to the PAPR.

The rectifier may further include a pilot signal provider configured to provide a pilot signal for estimating a channel status.

The simultaneous wireless information and power reception apparatus may further include a power splitter configured to split the received energy transfer signal by a predetermined power ratio.

The simultaneous wireless information and power reception apparatus may further include band-pass filters configured to have different pass-bands corresponding to sub-bands of an energy transfer signal for each group, among a number of groups, included in the received energy transfer signal.

The reception apparatus may be further configured to receive an I/O modulated signal, and may further include: a signal former configured to receive the number of tones having different frequencies included in the received energy transfer signal by being superimposed with each other and form a signal modulated based on the PAPR; a subtractor configured to receive a first signal in which the received energy transfer signal and the I/O modulated signal are superimposed with each other and the signal modulated based on the PAPR, estimate a difference between the first signal and the signal modulated based on the PAPR, and output the I/O modulated signal; and a down converter configured to convert the I/O modulated signal into a baseband by performing down conversion on the I/O modulated signal.

The reception apparatus may include any one of a wearable device, an Internet of things (IoT), and a bio sensor.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Hereinafter, a simultaneous wireless information and power transmission method, a simultaneous wireless information and power transmission apparatus 10, and a simultaneous wireless information and power reception apparatus 20, according to embodiments, will be described in detail with reference to the accompanying drawings.

Figure 1:
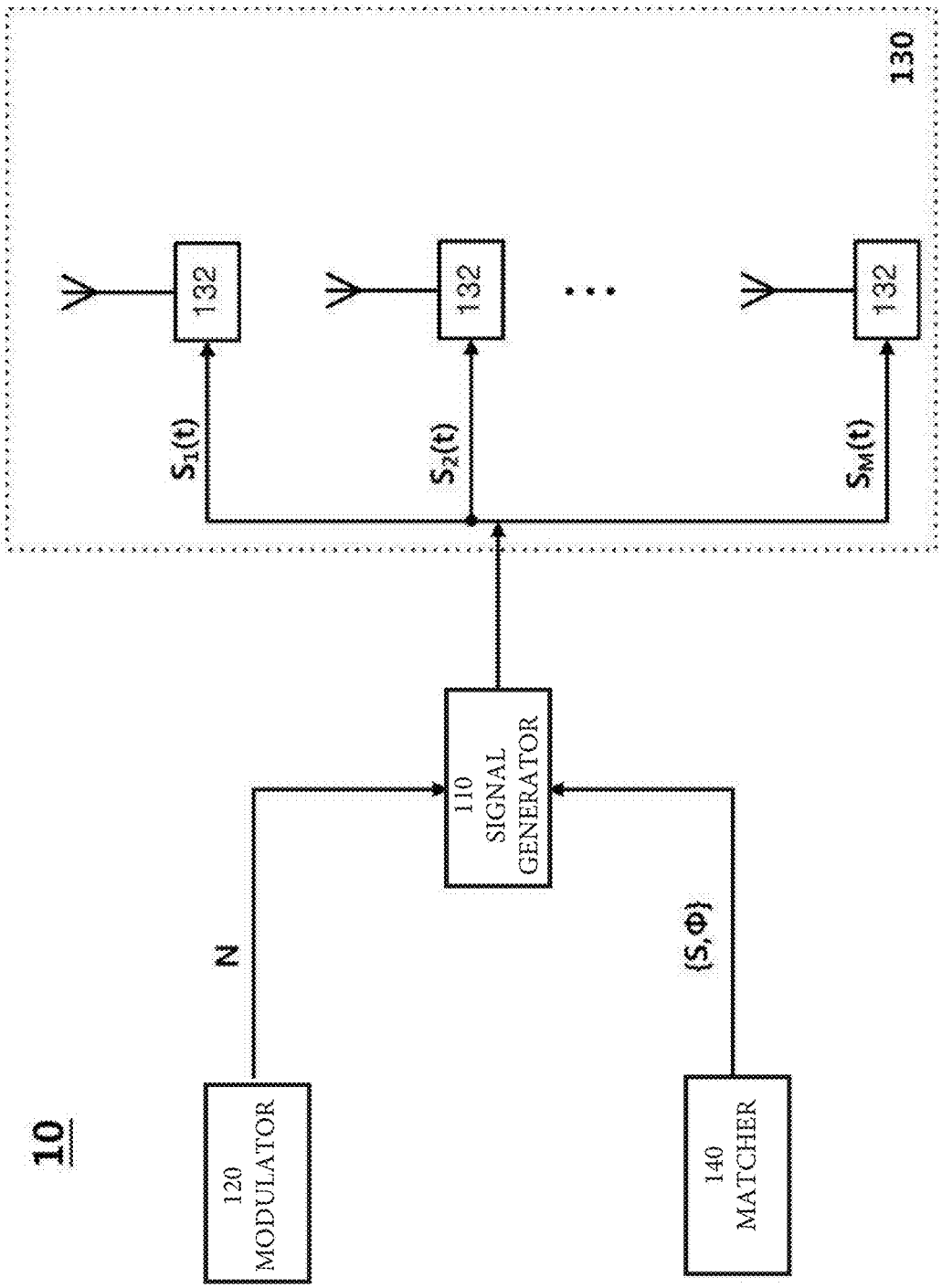
FIG. 1 is a block diagram illustrating a simultaneous wireless information and power transmission apparatus, according to an embodiment.
Figure 2:
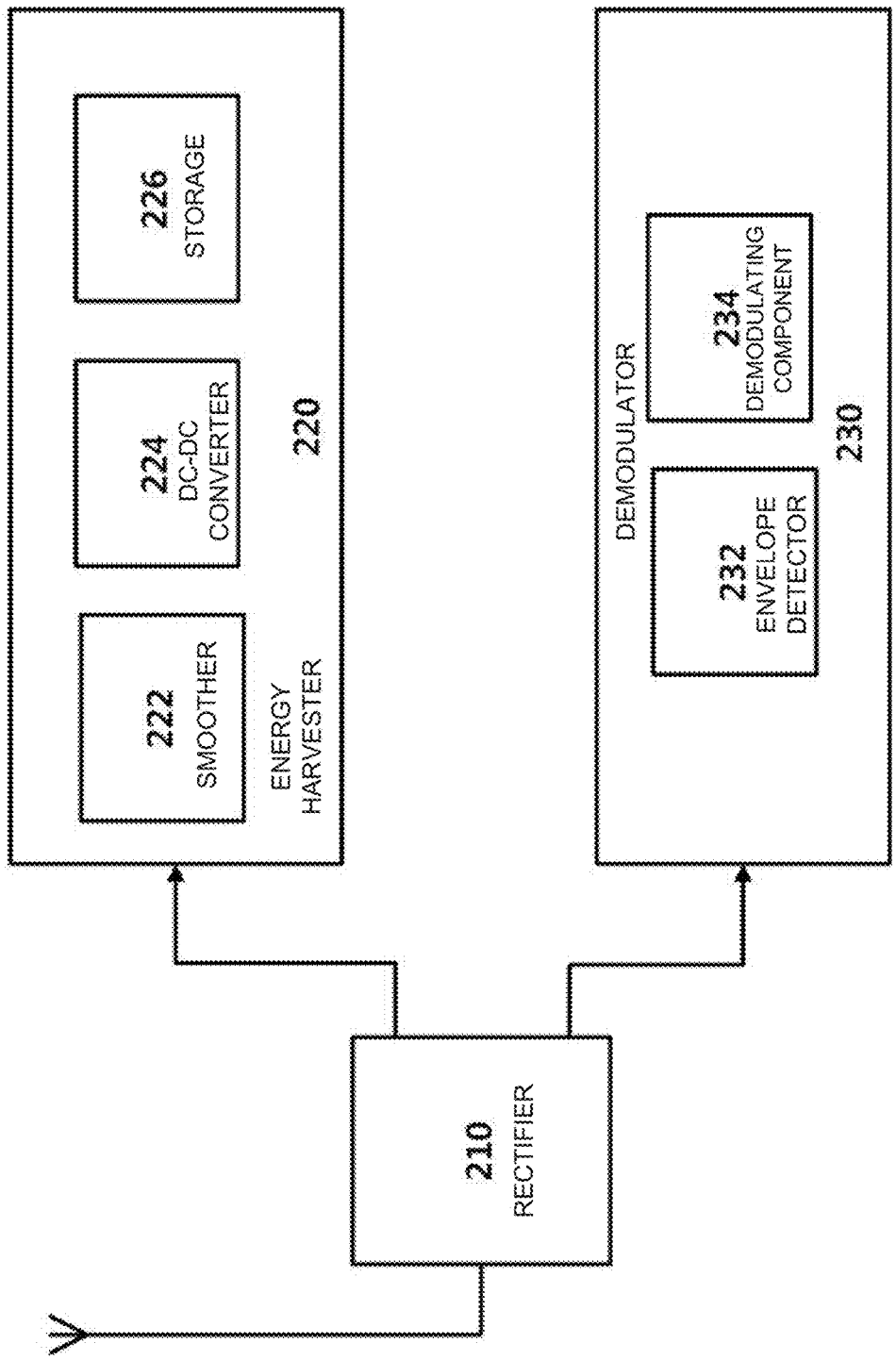
FIG. 2 is a block diagram illustrating a simultaneous wireless information and power reception apparatus, according to an embodiment.

FIG. 1 is a block diagram illustrating the simultaneous wireless information and power transmission apparatus 10, according to an embodiment. FIG. 2 is a block diagram illustrating the simultaneous wireless information and power reception apparatus 20, according to an embodiment.

Referring to FIGS. 1 and 2, a signal generator 110 forms an energy transfer signal. As an example, the signal generator 110 generates the energy transfer signal by linearly superimposing a number of multi-tones having different frequencies. The tones superimposed for generating the energy transfer signal may be sinusoidal waves. A peak of the energy transfer signal may be formed by linearly combining the multi-tones which are the sinusoidal waves having different frequencies. The energy transfer signal generated by the signal generator 110 may be expressed by the following Equation 1.

$$s_m(t) = \text{Re}\left\{\sum_{n=0}^{N-1} S_{n,m}\exp(j\omega_n t + j\phi_{n,m})\right\} \quad \text{[Equation 1]}$$

($s_m(t)$: an energy transfer signal for an $m^{th}$ antenna, $\omega_n$: an $n^{th}$ subcarrier frequency, $\varphi_{n,m}$: a corresponding initial phase, $S_{n,m}$: a corresponding amplitude, N: the number of tones having different frequencies)

A modulator 120 controls the signal generator 110 such that an energy transfer signal having a desired peak-to-average power ratio (PAPR) is generated. As expressed by the following Equation 2, a maximum value of the PAPR of the energy transfer signal at a transmission side may increase as the number of tones N superimposed for generating the energy transfer signal increases. In the transmission apparatus 10, the maximum value of the PAPR may be obtained when the initial phases of the tones superimposed for generating the energy transfer signal are aligned.

$$PAPR_{TX}^m = \frac{\max_{t\in[0,T]}|s_m(t)|^2}{\frac{1}{T}\int_T |s_m(t)|^2 dt} \leq 2N \quad \text{[Equation 2]}$$

(N: the number of tones, $s_m(t)$: an output signal provided to an $m^{th}$ antenna unit)

When the initial phases of the tones included in the energy transfer signal are equal to each other, the transmission apparatus 10 transmits desired information to the reception apparatus 20 by controlling the PAPR of the energy transfer signal since the number of tones N forming the energy transfer signal and the maximum value of the PAPR are able to be mapped 1:1 with each other, and the reception apparatus 20 receives the energy transfer signal and recover the information transmitted from the transmission apparatus 10 by measuring the PAPR.

In an embodiment, the PAPR of the energy transfer signal is obtained by calculating a ratio of a peak power value of the energy transfer signal and an average power value of the energy transfer signal. In another embodiment, the PAPR of the energy transfer signal is obtained by calculating a ratio of a peak value of the amplitude of the energy transfer signal and an average value of the amplitude of the energy transfer signal. The ratio of the peak value of the amplitude of the energy transfer signal to the average value of the amplitude of the energy transfer signal and the ratio of the peak power value of the energy transfer signal to the average power value of the energy transfer signal may have a difference of 3 dB. An antenna array 130 includes M antenna units 132 and transmits the energy transfer signal formed by superimposing the N tones.

A matcher 140 performs amplitude matching and phase matching of the energy transfer signal to improve the wireless power transfer efficiency and maintain the PAPR of the energy transfer signal in the reception apparatus 20. In an embodiment, the matcher 140 receives a pilot signal output by the reception apparatus 20, estimates a multi-tone or multi-antenna channel status, and performs the amplitude matching and the phase matching of the energy transfer signal based on the estimated result.

The energy transfer signal output by the antenna array 130 and output through a multipath fading channel (MFC) may be expressed by the following Equation 3.

$$r(t) = \text{Re}\left\{\sum_{m=1}^{M}\sum_{n=0}^{N-1} S_{n,m} h_{n,m}\exp(j\omega_n t + j\phi_{n,m})\right\} + \eta(t) \quad \text{[Equation 3]}$$

($\eta$: antenna reception noise (zero-mean/$N_o B_T$-variance AWGN), h: a complex-valued channel gain)

When assuming an L-multipath, the complex-valued channel gain may be modeled as expressed by the following Equation 4.

$$h_{n,m} = \sum_{l=0}^{L-1} a_{n,m,l}\exp(j\theta_{n,m,l}) \quad \text{[Equation 4]}$$

The matcher 140 receives the pilot signal provided by the reception apparatus 20, estimates the multi-tone/multi-antenna channel status information (CSI) $\{h_{n,m}|n=0, 1, \ldots, N-1; m=1, 2, \ldots, M\}$, and performs the amplitude $S_{n,m}$ matching and the phase $\varphi_{n,m}$ matching of the multi-tone/multi-antenna output signal as expressed by the following Equation 5 based on the estimated result.

The amplitude $S_{n,m}$ of the energy transfer signal may be confirmed to be proportional to the channel gain $h_{n,m}$ in Equation 5. The matcher 140 matches the amplitude $S_{n,m}$ of the energy transfer signal to be proportional to the channel gain through which the energy transfer signal passes.

$$S_{n,m}\exp(j\phi_{n,m}) = \sqrt{2P}\frac{h_{n,m}^*}{\sqrt{\sum_{m=1}^{M}\sum_{n=0}^{N-1}|h_{n,m}|^2}} \quad \text{[Equation 5]}$$

($h^*$: complex conjugate of h)

When assuming that a channel vector on an $n^{th}$ subcarrier of M multiple antennas is $h_n = [h_{n,1}, \ldots, h_{n,m}]$, a signal received by performing a matched filtering (MF) in the MFC may be expressed by the following Equation 6.

$$r(t) = \sqrt{\frac{2P}{\sum_{n=0}^{N-1}\|h_n\|^2}}\sum_{n=0}^{N-1}\|h_n\|^2\cos(\omega_n t) + \eta(t) \quad \text{[Equation 6]}$$

(n: noise)

A peak-to-average power ratio $PAPR_{RX}$ of the signal received by the reception apparatus 20 may be estimated by the following Equation 7.

$$PAPR_{RX} = \frac{\max_{t \in [0,T]} |r(t)|^2}{\frac{1}{T} \int_T |r(t)|^2 dt} \cong \frac{\left| \sqrt{2P \sum_{n=0}^{N-1} \|h_n\|^2} + \eta \right|^2}{\frac{P \sum_{n=0}^{N-1} \|h_n\|^4}{\sum_{n=0}^{N-1} \|h_n\|^2} + N_0 B_T}$$ [Equation 7]

When neglecting noise and assuming a frequency-flat channel (FFC) characteristic, the $PAPR_{RX}$ in the reception apparatus 20 may be estimated by the following Equation 8, since $h_n = h$.

$$PAPR_{RX} \cong \frac{2N\|h\|^4}{\|h\|^4} = 2N$$ [Equation 8]

Accordingly, when the amplitude and phase matched energy transfer signal is received, the maximum value of the $PAPR_{RX}$ of the energy transfer signal can be obtained regardless of the channel gain, and the maximum $PAPR_{RX}$ of the energy transfer signal may be confirmed to be equal to the maximum value of the PAPR of the energy transfer signal in the transmission apparatus estimated by Equation 2.

The matcher 140 selects a well-conditioned sub-band corresponding to the FFC in a frequency-selective channel (FSC) through which the energy transfer signal passes, performs amplitude matching such that the channel gain in the selected sub-band is higher compared to that of an unselected sub-band, and performs phase matching such that the phases of multi-tones of the energy transfer signal in the selected sub-band are aligned in the reception apparatus.

A vector summation is performed on the energy transfer signal transmitted to the antenna array 130 of the transmission apparatus 10 in an antenna of the reception apparatus 20 through the MFC including a direct path and a number of reflection paths. In order to obtain the maximum value of the $PAPR_{RX}$ in the reception apparatus 20, the phases of multi-tones of the energy transfer signal that are received should be matched. Accordingly, the matcher 140 controls the signal generator 110 such that the phases of multi-tones of the energy transfer signal received by the antenna of the reception apparatus 20 are aligned with each other by performing the phase matching according to Equation 5 based on the estimated result of the antenna CSI.

The reception apparatus 20 includes a rectifier 210 that receives and rectifies the energy transfer RF signal by including a diode, an energy harvester 220 that charges an energy storage device using a direct signal (DC) provided by the rectifier 210 by including the energy storage device, and a demodulator 230 that detects a peak value by performing an envelope detection on a signal rectified and provided by the rectifier 210 and detecting an average value of the energy transfer signal.

The reception apparatus 20 may further include a power splitter (refer to PS in FIGS. 5 and 6) splitting the DC signal provided by the rectifier 210 at a desired power ratio. The power splitter PS provides a split signal by splitting the DC signal output by the rectifier 210 at the desired power ratio. The power splitter PS may provide the split signal to the demodulator 230 by splitting the signal to have a predetermined portion of minimum power capable of recovering the transmitted information through smoothing, envelop detection, and demodulation, and thus may improve the wireless power transfer efficiency by providing a remaining signal to the energy harvester 220.

In an embodiment, the energy harvester 220 includes a smoother 222 smoothing the signal rectified by the rectifier 210, a DC-DC converter 224 controlling a DC voltage, and an energy storage 226 including an energy storage device.

The smoother 222 may include a smoothing capacitor (not shown) and a resistor (not shown) that receive and smooth the DC output by the rectifier 210, and smooth the rectified signal. The DC-DC converter 224 receives a smoothed DC signal, removes ripple of the smoothed DC signal, convert a level of the DC signal, and provide the converted level of DC signal to the energy storage 226. The energy storage 226 may include an energy storage device such as a super capacitor (not shown), a rechargeable battery (not shown), and a capacitor (not shown), and store the energy transferred through the energy transfer signal.

The demodulator 230 includes an envelope detector 232 that receives the signal provided by the rectifier 210 and performs an envelope detection on the signal provided by the rectifier 210, and a demodulation component 234 that obtains an average value of the energy transfer signal, measures the PAPR using a peak value obtained by the envelope detection being performed, and demodulates the signal provided as the energy transfer signal.

The envelope detector 232 receives a pulse signal output by the rectifier and detects a peak value of the energy transfer signal. Since the rectifier 210 outputs the pulse signal obtained by rectifying the energy transfer signal, the envelope detector 232 detects the peak value of the energy transfer signal by performing envelope detection on the pulse signal.

The demodulation component 234 obtains an average value of the energy transfer signal and measures the PAPR of the energy transfer signal using the peak value of the energy transfer signal obtained by the envelope detector 232. As may be confirmed from Equation 8, when the phases of multi-tones of the energy transfer signal received by the antenna of the reception apparatus are aligned, the maximum value of the PAPR of the energy transfer signal can be obtained. Since the obtained PAPR is mapped 1:1 to the information transmitted by the transmission apparatus 10, the information may be recovered by measuring the PAPR.

As one implementation example, the demodulation component 234 obtains the PAPR by obtaining the peak power value and the average power value of the energy transfer signal. As another implementation example, the demodulation component 234 obtains the PAPR by calculating the peak value and the average value of the amplitude of the energy transfer signal. As described above, the PAPR obtained from the peak power value and the average power value of the energy transfer signal and the PAPR obtained from the peak value and the average value of the amplitude of the energy transfer signal may have a difference of 3 dB.

In an embodiment, the reception apparatus 20 further includes a pilot signal provider (not shown) that provides a pilot signal for estimating a channel status. As an example, the pilot signal provider provides a signal having a pulse form or an impulse form as the pilot signal, and the transmission apparatus 10, which is described above, receives the pilot signal and estimates the channel status.

Figure 3:
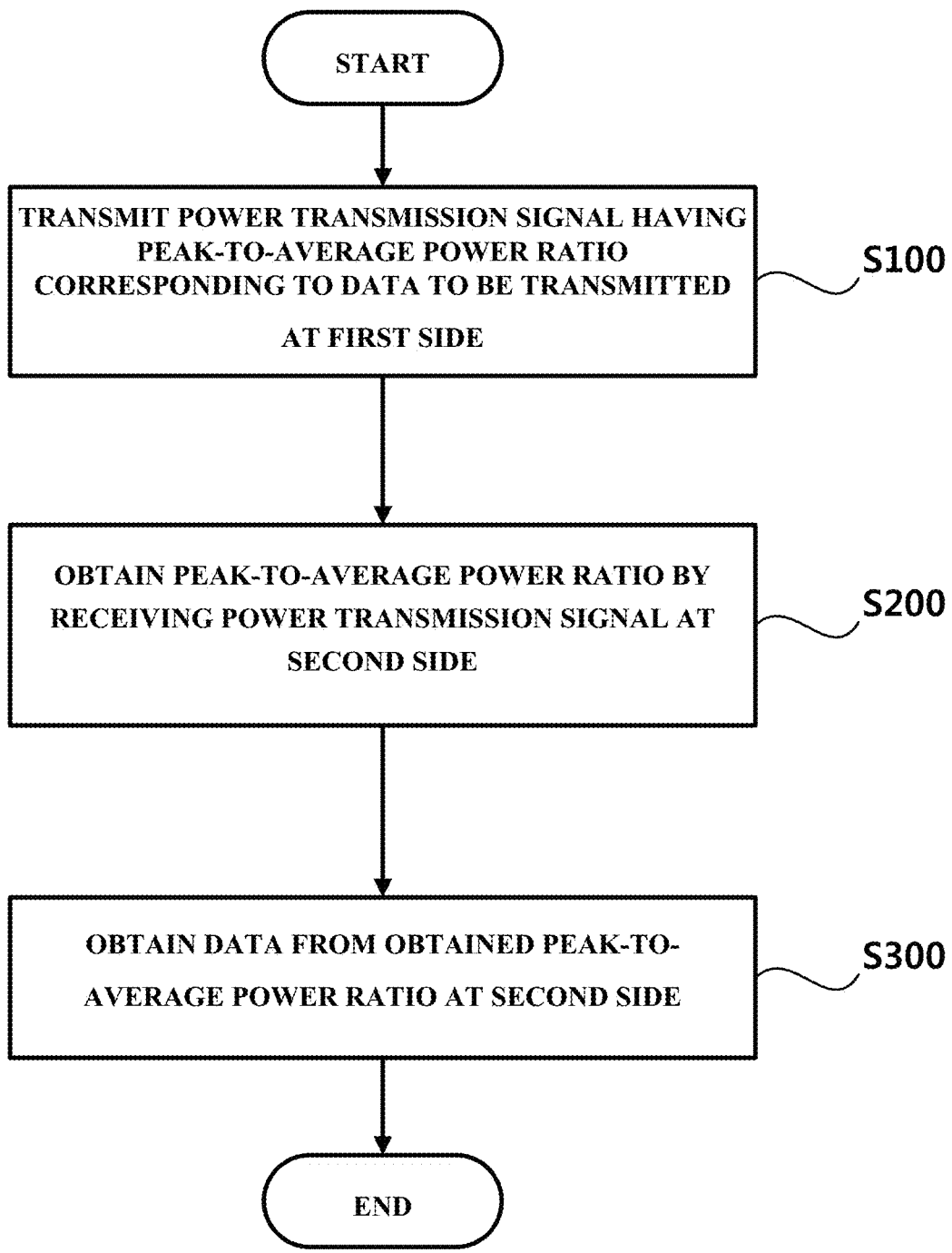
FIG. 3 is a flowchart illustrating a simultaneous wireless information and power transmission method, according to an embodiment.

FIG. 3 is a flowchart illustrating a simultaneous wireless information and power transmission method, according to an embodiment. Referring to FIGS. 1 to 3, in operation S100, the transmission apparatus 10 receives digital data to be transmitted and transmits an energy transfer signal having a PAPR corresponding to the received digital data. When the transmission apparatus 10 transmits $\log_2 Q$-bits of digital data to the reception apparatus 20, the modulator 120 receives the $\log_2 Q$-bits of data to be transmitted. The modulator 120 estimates the number of tones (N=1, 2, ..., Q) corresponding to the data and provides the number of tones to the signal generator 110.

The number of tones needed when transmitting the $\log_2 Q$-bits of data may be Q. As an example, when transmitting 3-bits including {000, 001, 010, 011, 100, 101, 110, 111}, at least 8 tones having different frequencies are needed. When the number of tones N corresponding to the 3-bits including {000, 001, 010, 011, 100, 101, 110, 111} is {1, 2, 3, 4, 5, 6, 7, 8}, the modulator 120 receives the data and provides 7 which is the number of tones corresponding to {110} to the signal generator 110 when the data to be transmitted is 3-bits of {110}.

Continuing in operation S100, the signal generator 110 receives a signal designating the number of tones N provided by the modulator 120 and generates the energy transfer signal by superimposing the designated number of tones. The signal generator 110 performs a power amplifying operation on the generated energy transfer signal and transmits the power amplified energy transfer signal to the reception apparatus 20 through an antenna array 300.

In an embodiment, the transmission apparatus 10 further performs an operation including the amplitude matching and the phase matching of an energy transfer signal. The matcher 140 receives a pilot signal provided from the reception side, estimates a channel status, and performs the amplitude matching and the phase matching of an energy transfer signal output from each antenna module 132 of the antenna array 300 using the estimated result. As an example, the amplitude matching and the phase matching are performed by an operation expressed by Equation 5 described above.

The amplitude matching and the phase matching may be performed before transmitting the energy transfer signal, and may be periodically performed. In another example, the amplitude matching and the phase matching may be aperiodically performed according to need.

The matcher 140 performs the amplitude matching such that the amplitude of the energy transfer signal is adjusted in proportion to a channel status. Since the amplitude of the energy transfer signal transmitted through a channel having a good status is formed to be large, an energy loss in an energy transfer process may be decreased and wireless power transfer efficiency may be increased.

In operation S200, the reception apparatus 20 receives the energy transfer signal and measures the PAPR. In an example, the energy transfer signal received through an antenna of the reception apparatus 20 is a signal transmitted through multipath but the multipath signals may be aligned so that the phases thereof are matched when the reception apparatus 20 receives the signal by the matcher 140. Accordingly, the maximum value of the PAPR of the energy transfer signal at the reception side may be maintained as the maximum value of the PAPR in the transmission side, and data to be transmitted at the transmission side can be recovered.

The reception apparatus 20 rectifies the received energy transfer signal, obtains a peak value of the amplitude of the energy transfer signal by performing the envelope detection on the rectified pulse signal, and measures the PAPR of the energy transfer signal by obtaining an average value of the amplitude of the energy transfer signal.

The reception apparatus 20 obtains data from the measured PAPR in operation S300. As described above, the measured PAPR may correspond to the number of tones N superimposed in order to form the energy transfer signal at a 1:1 correspondence. Accordingly, the digital data corresponding to the number of tones N may be obtained by measuring the PAPR.

In an embodiment, the reception apparatus 20 smooths the received energy transfer signal, converts a DC level of the smoothed signal, and stores the signal having the converted DC level in the energy storage 226. As described above, since the amplitude matching is performed, wireless power transfer efficiency may be improved.

Figure 7:
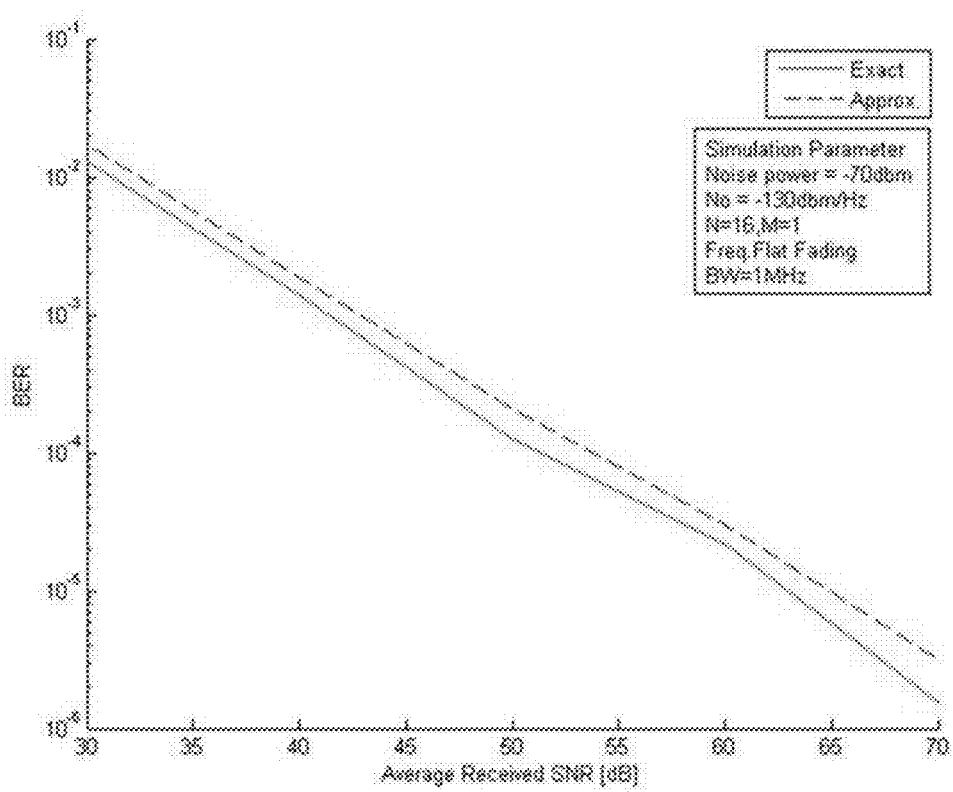
FIG. 7 is a diagram illustrating a test result of information transmission, according to an embodiment.

FIG. 7 is a diagram illustrating a test result of information transmission, according to an embodiment. Referring to FIG. 7, it can be confirmed that the normal input power of the energy harvester 220 is −10 dBm∼−30 dBm, the power spectral density (PSD) of noise is $N_o$=−130 dBm/Hz, the signal-to-noise ratio (SNR) is 40 dB to 60 dB at the transmission frequency band which is $B_T$=1 MHz, and the bit error rate (BER) performance is $10^{-3} \sim 10^{-5}$.

According to an embodiment, since power is transferred to the reception apparatus 20 using the energy transfer signal in which multiple tones are superimposed and much larger energy can be transferred through a better channel according to amplitude matching, the wireless power transfer efficiency can be improved in comparison to the conventional art. Further, there may be an advantage that the wireless power transfer efficiency is further improved by selecting a relatively better sub-band in an FSC, a selected sub-band may show a channel characteristic of an FFC, and an effect of a fading channel may be offset in Equation 8 since information is transmitted using a ratio of a maximum value and an average value of a signal transmitted through the selected sub-band. Thus, data may be recovered without estimating the channel at the reception side, even in an MFC environment showing a time varying characteristic.

Accordingly, embodiments disclosed herein may provide significantly improved wireless power transfer efficiency in comparison to conventional single-tone power transfer technology. Further, an effect of a time-varying fading channel at the reception side may be small in comparison to a method of transmitting information using the conventional single-tone amplitude modulation. The single-tone amplitude modulation scheme may need to estimate a channel status when recovering information at the reception side, and the disclosed embodiments may implement a low power receiver since the information is able to be recovered without estimating the channel status.

Figure 4:
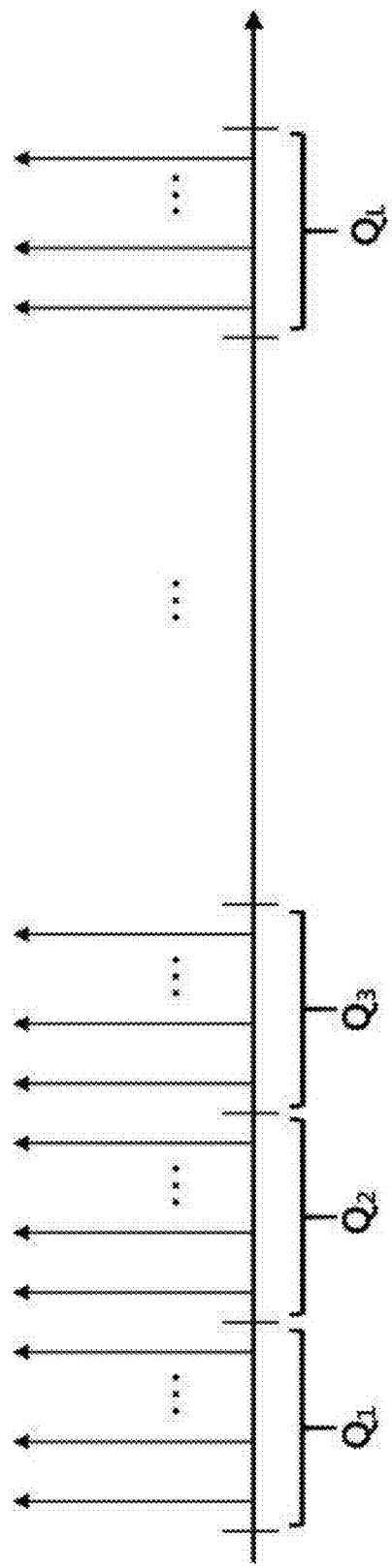
FIG. 4 is a conceptual diagram illustrating a form in which Q tones are divided into L groups.

Hereinafter, an additional embodiment will be described with reference to the accompanying drawings. The same or similar descriptions as the embodiments described above are omitted for a concise and clear description. FIG. 4 is a conceptual diagram illustrating a form in which Q tones are divided into L groups, and FIG. 5 is a conceptual diagram illustrating the reception apparatus 20, according to an embodiment.

Referring to FIG. 4, when splitting Q tones into L groups, the Q tones may be split into $Q_1, Q_2, \ldots, Q_L$ groups. Each group may include a tone having $Q_l$ different frequencies and transmit the energy transfer signal formed for each group. $\log_2 Q_l$-bits of digital data for each group may be transmitted using the energy transfer signal formed for each group, and a total of $\log_2 Q_1 + \log_2 Q_2 + \ldots + \log_2 Q_L$-bits of digital data for the L groups including the Q tones may be transmitted.

In an example, when there are tones having a total of 32 different frequencies and the tones are divided into 8 groups that each includes 4 tones, one group may transmit $\log_2 4 = 2$- bits of digital data, and the 8 groups can transmit 16-bits of digital data. In another example, there may be tones having a total of 32 different frequencies, and the tones may be divided into two groups that each includes 4 tones, one group that includes 8 tones, and one group that includes 16 tones. Each of the groups including 4 tones can transmit $\log_2 4=2$-bits of digital data, the one group including 8 tones can transmit $\log_2 8=3$-bits of digital data, and the one group including 16 tones can transmit $\log_2 16=4$-bits of digital data. Accordingly, a total of $2 \times 2+3+4=11$-bits of digital data can be transmitted.

Figure 5:
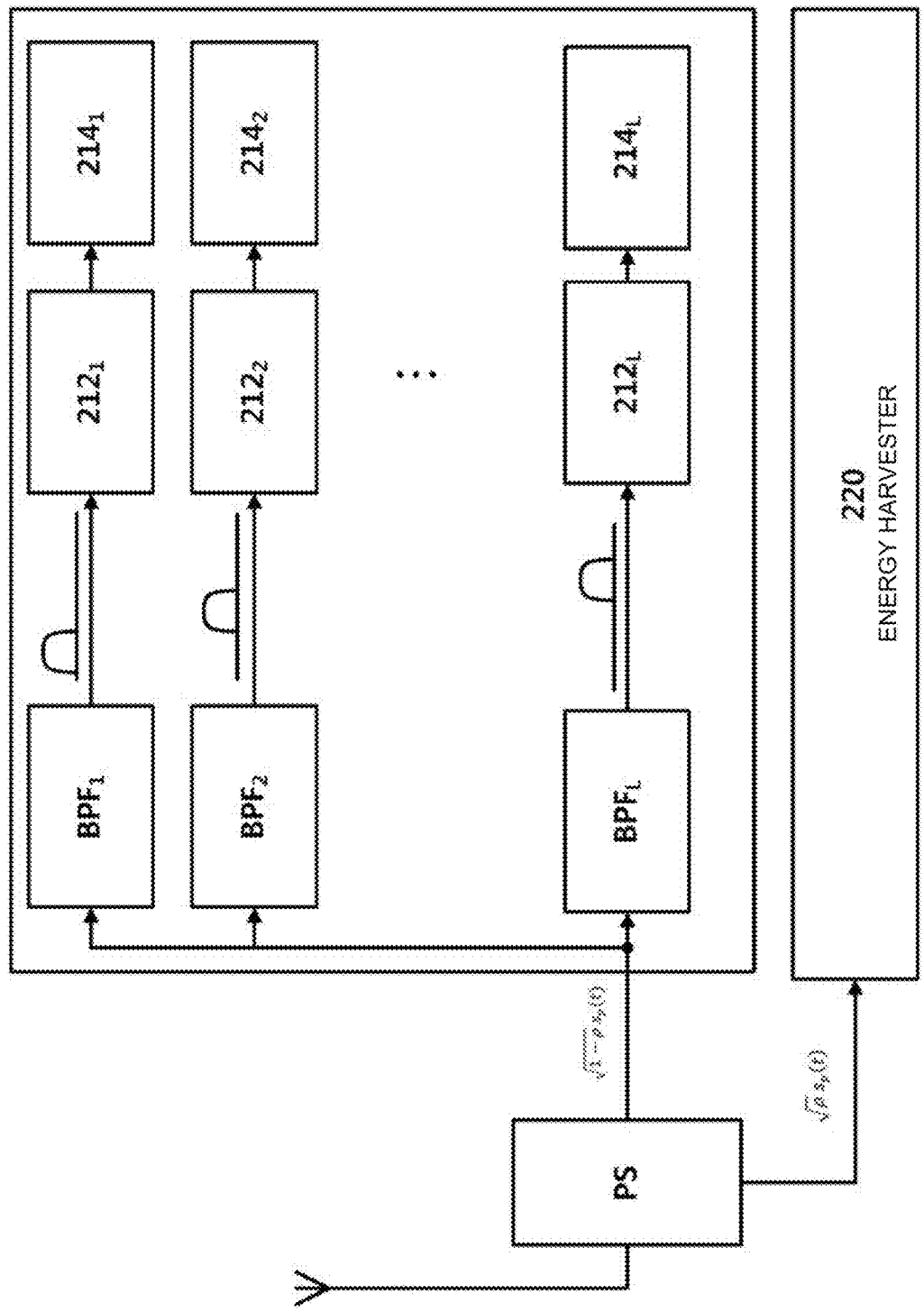
FIG. 5 is a conceptual diagram illustrating an example of a reception apparatus, according to an embodiment.

Referring to FIG. 5, the reception apparatus 20 further includes a power splitter PS that splits a signal to have a predetermined power, and the split signals may be split by band-pass filters ($BPF_1$, $BPF_2$, ..., $BPF_L$) for a specific sub-band of each group. The PAPR for each group may be measured by performing envelope detection ($212_1$, $212_2$, ..., $212_L$) and demodulation operations ($214_1$, $214_2$, ..., $214_L$) on a signal passing through the band-pass filter, and data corresponding to the measured PAPR may be recovered. The energy collection using an energy transfer signal, which was described above, may be performed by the energy harvester 220.

In a method according to the embodiment of FIG. 5, since an effect of noise in a process of measuring the PAPR at the reception side is limited to a frequency sub-band of a corresponding group, the effect of the noise may be decreased when receiving information. As described above, since an effect of an MFC is offset in the process of measuring the PAPR, the information may be received by minimizing the effect by the MFC.

For example, this embodiment may also be used even in a wide-area wireless sensor network. That is, data may be simultaneously transmitted using a frequency-division multiplexing (FDM) method by regionally clustering multiple sensors in units of groups and dividing tones for each sensor group. The amount of data transmitted to each group may be adjusted by changing the number of tones allocated to each group. Accordingly, the data may be simultaneously transmitted using the FDM method by allocating part of the tones for each group proposed in the second embodiment to satisfy data rate and transferred power requirements in a given wireless sensor network, or a method of transmitting data to each sensor group using all the tones available in a given time with no overlap, using a time-division multiplexing (TDM) method, may be used as a dual mode.

Figure 6:
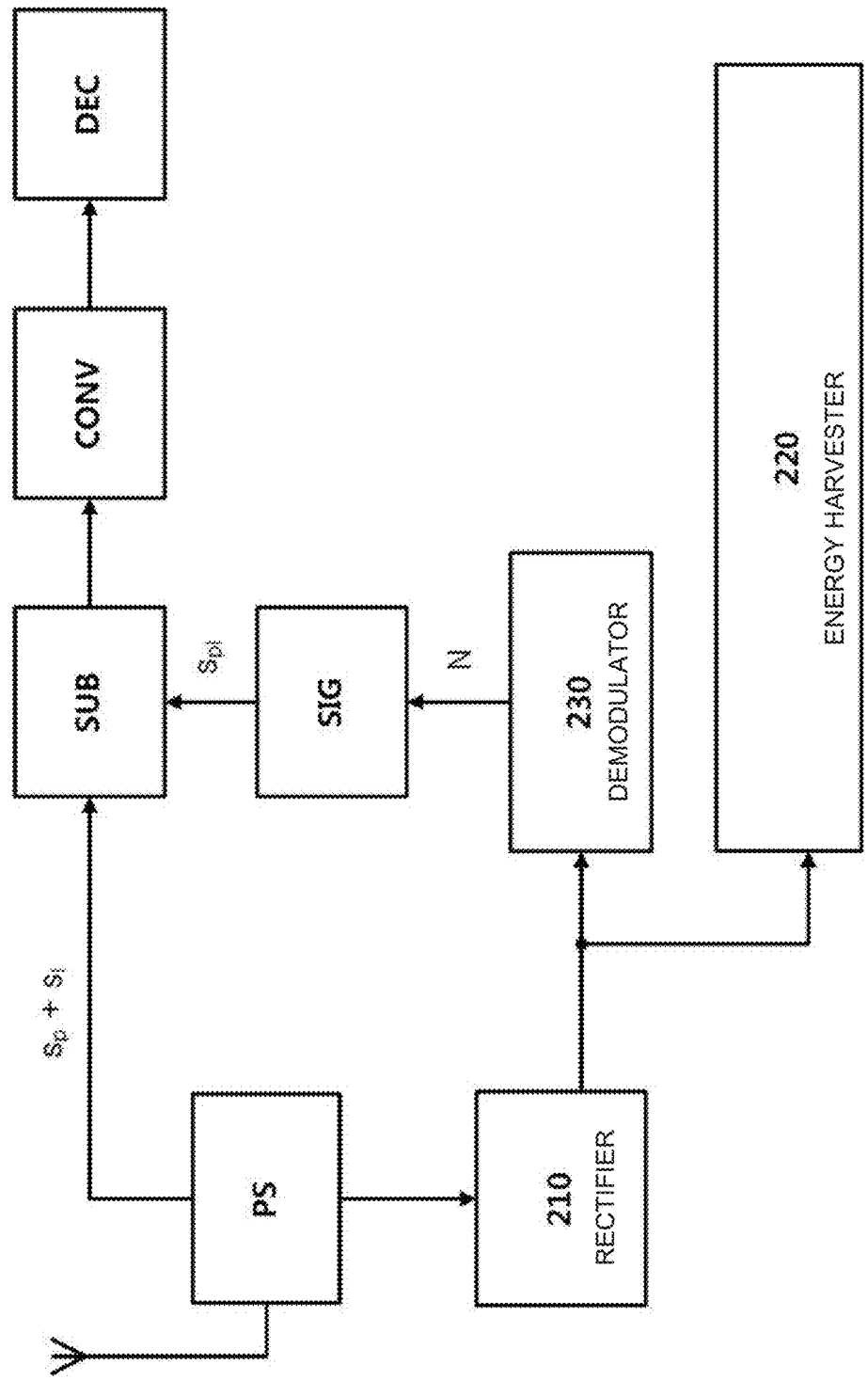
FIG. 6 is a conceptual diagram illustrating an example of a reception apparatus, according to another embodiment.

Hereinafter, an additional embodiment will be described with reference to the accompanying drawings. The same or similar descriptions as the embodiments described above are omitted for a concise and clear description. FIG. 6 is a conceptual diagram illustrating a configuration of the reception apparatus 20, according to an embodiment.

According to an embodiment, a simultaneous transmission of a composite signal having various combinations is possible by superimposing a signal modulated on the basis of the PAPR and a signal modulated by the conventional I/O modulation method and performing a combined modulation on the superimposed signals. An energy transfer signal in an $m^{th}$ antenna using the combined modulation method according to an embodiment of the present invention may be expressed by the following Equation 9.

$$s_m(t) = S_{P,m}(t) + \alpha S_{I,m}(t) \qquad \text{[Equation 9]}$$

($S_{P,m}(t)$ represents a signal modulated on the basis of the PAPR, $S_{I,m}(t)$ represents the conventional I/O modulated signal, $\alpha$: a ratio of the signal modulated on the basis of the PAPR and the conventional I/O modulated signal)

In Equation 9, since the signal modulated on the basis of the PAPR is designed as the high output signal, the conventional I/O modulated signal is designed as the low output signal, and the two signals are superimposed, a may have a value smaller than 1 ($\alpha \ll 1$).

Referring to FIG. 6, the power splitter PS receives an energy transfer signal received by the reception apparatus 20 and provides a split signal to the rectifier 210 by splitting the signal to have a predetermined power. The demodulator 230 receives an output of the rectifier 210, recovers data by demodulating the modulated signal based on the PAPR, and provides information related to the number of tones N forming the energy transfer signal to a signal former SIG. The conventional I/O modulated signal $S_{I,m}$ in the energy transfer signal may be the low output signal and acts as an interference signal.

The information related to the number of tones N forming the energy transfer signal provided by the demodulator 230 is provided to the signal former SIG. The signal former SIG forms the signal $S_{P,m}(t)$ modulated on the basis of the PAPR from the number of tones N provided and provides the modulated signal $S_{P,m}(t)$ to a subtractor SUB.

The subtractor SUB receives an energy transfer signal split by a power splitter PS as one input, receives the signal $S_{P,m}(t)$ modulated on the basis of the PAPR provided by the signal former SIG as another input, and outputs the I/O modulated signal $S_{I,m}(t)$ which is a difference between the two signals.

A down converter CONV performs down conversion on the I/O modulated signal and inputs the down-converted signal to a decoder DEC. The decoder DEC decodes the signal which is down-converted into a baseband into a digital bit and output the digital bit.

In an example, information and power are simultaneously transmitted according to various system requirements (quality-of-services) by superimposing a signal modulated using the PAPR according to an embodiment disclosed herein and a signal modulated by the I/O modulation method, and transmitting the superimposed signal.

The simultaneous wireless information and power transmission method according to embodiments described above may be effectively applied to an IoT sensor, a wearable device, or a bio sensor, for example, of low power and low cost. Further, wireless power may be effectively transferred by performing the MF according to the CSI, and the simultaneous wireless information and power transmission method according to embodiments described above may be widely applied to an environment requiring low power and low cost, since information is recovered without estimating the channel at the reception side.

According to embodiments disclosed herein, simultaneous wireless information and power transmission may be performed with high transmission efficiency without loss of time resource. Further, power consumption may be small at the reception side since the channel estimation is not performed at the reception side, and a channel fading effect is offset and information transmission with high reliability may be assured since the information is transmitted and received using a completely new form of PAPR.

The signal generator 110, the modulator 120, and the matcher 140 in FIG. 1, the smoother 222, the DC-DC converter 224, the storage 226, the envelope detector 232, and the demodulating component 234 in FIG. 2, the rectifier 210 in FIGS. 2 and 6, the energy harvester 220 in FIGS. 2, 5, and 6, the band-pass filters $BPF_1$-$BPF_L$, the envelope detectors $212_1$-$212_L$, and the demodulating components $214_1$-$214_L$ in FIG. 5, the power splitter PS in FIGS. 5 and 6, and the signal former SIG, the subtractor SUB, the down converter CONV, and the decoder DEC in FIG. 6 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIG. 3 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless information and power transmission/reception method, comprising:
    modulating information into an energy transfer signal having a peak-to-average power ratio (PAPR) associated with the information at a first unit;
    transmitting the modulated energy transfer signal at the first unit;
    receiving the transmitted energy transfer signal at a second unit; and
    demodulating the information from the received energy transfer signal by measuring the PAPR of the received energy transfer signal at the second unit,
    wherein, in the modulating of the information, a maximum value of the PAPR is one-to-one mapped to the information, and changes in correspondence with a number of tones that form the energy transfer signal.

2. The method of claim 1, wherein the modulated energy transfer signal is a signal in which N(N=1, 2, ..., Q) tones having different frequencies are superimposed, and the information comprises $\log_2$ Q-bits of digital data (Q, N: natural numbers).

3. The method of claim 1, further comprising:
    transmitting a pilot signal at the second unit;
    receiving the pilot signal and estimating a channel status from the received pilot signal at the first unit; and
    calculating an amplitude and a phase of the energy transfer signal from the estimated channel status at the first unit.

4. The method of claim 3, wherein the calculating of the amplitude and the phase of the energy transfer signal comprises aligning phases of tones that are superimposed in the energy transfer signal.

5. The method of claim 3, wherein
    the calculating of the amplitude and the phase of the energy transfer signal further comprises matching the amplitude and the phase by performing a complex conjugate of the estimated channel status.

6. The method of claim 1, wherein the second unit comprises any one of a wearable device, an Internet of things (IoT) device, and a bio sensor.

7. The method of claim 1, further comprising charging an energy storage device by rectifying the received energy transfer signal.

8. The method of claim 1, wherein
    the transmitting of the modulated energy transfer signal comprises transmitting the modulated energy transfer signal for each group among a number of groups, and
    the energy transfer signal for each group comprises a signal including tones having different frequencies and being linearly superimposed on each other.

9. The method of claim 8, wherein the recovering of the information comprises receiving the energy transfer signal for each group, splitting the energy transfer signal for each group according to an allocated channel sub-band, and measuring the PAPR for the energy transfer signal of each group.

10. The method of claim 8, wherein
    the demodulating of the PAPR is performed by receiving the energy transfer signal for each group,
    the energy transfer signal for each group is split according to a sub-band allocated to different wireless sensor groups, and
    the PAPR for the energy transfer signal of the split group is measured.

11. The method of claim 1, wherein
    the transmitting of the modulated energy transfer signal comprises transmitting the modulated energy transfer signal for each group among a number of groups, and
    the energy transfer signal for each group comprises a signal formed by superimposing a number of tones having different frequencies allocated to different wireless sensor groups.

12. The method of claim 1, wherein the transmitting of the modulated energy transfer signal further comprises transmitting an I/Q modulated signal.

13. The method of claim 12, further comprising recovering information from the I/Q modulated signal by:
    obtaining a number of different frequencies that are superimposed in the energy transfer signal transmitted by the first unit from the measured PAPR at the second unit,
    superimposing tones having different frequencies corresponding to the number of different frequencies, and
    obtaining a difference signal corresponding to a difference between the received signal and a signal obtained by the superimposing of the tones having the different frequencies corresponding to the number of different frequencies.

14. A wireless information and power transmission/reception system, comprising:
    a first unit comprising
        a signal generator configured to generate an energy transfer signal,
        a modulator configured to modulate information into the energy transfer signal by controlling the signal generator to generate the energy transfer signal with a peak-to-average power ratio (PAPR) associated with the information, and
        a first antenna configured to transmit the modulated energy transfer signal; and a second unit comprising
        a second antenna configured to receive the transmitted energy transfer signal,
        a rectifier configured to rectify the received energy transfer signal, and output the rectified energy transfer signal,
        an energy storage device configured to be charged by a signal output by the rectifier, and
        a demodulator configured to demodulate the information from the rectified energy transfer signal by measuring the PAPR in the rectified energy transfer signal,
    wherein, in the modulating of the information, a maximum value of the PAPR is one-to-one mapped to the information, and changes in correspondence with a number of tones that form the energy transfer signal.

15. The system of claim 14, wherein the signal generator is further configured to generate the energy transfer signal by linearly superimposing tones having different frequencies to have the PAPR corresponding to information, and the information to be transmitted comprises bits of digital data.

16. The system of claim 14, further comprising a matcher configured to match phases of multi-tones of the energy transfer signal such that phases of the energy transfer signal received by the second unit are aligned.

17. The system of claim 14, wherein the first unit further comprises a matcher configured to select a sub-band corresponding to a frequency-flat channel (FFC) among a number of channels through which the energy transfer signal passes, and perform amplitude matching such that an amplitude of the received energy transfer signal in the selected sub-band is larger than an amplitude of the received energy transfer signal in an unselected sub-band.

18. The system of claim 14, wherein the rectifier comprises a pilot signal provider configured to provide a pilot signal for estimating a channel status.

19. The system of claim 14, wherein the second unit further comprises a power splitter configured to split the received energy transfer signal by a predetermined power ratio.

20. The system of claim 14, wherein the second unit further comprises band-pass filters configured to have different pass-bands corresponding to sub-bands of an energy transfer signal for each group, among a number of groups, included in the received energy transfer signal.

21. The system of claim 14, wherein the second unit is further configured to receive an I/Q modulated signal, and further comprises
  a signal former configured to receive the number of tones having different frequencies included in the received energy transfer signal by being superimposed with each other, and form a signal modulated based on the PAPR,
  a subtractor configured to receive a first signal in which the received energy transfer signal and the I/Q modulated signal are superimposed with each other and the signal modulated based on the PAPR, estimate a difference between the first signal and the signal modulated based on the PAPR, and output the I/Q modulated signal, and
  a down converter configured to convert the I/Q modulated signal into a baseband by performing down conversion on the I/Q modulated signal.

22. The system of claim 14, wherein the second unit comprises any one of a wearable device, an Internet of things (IoT), and a bio sensor.

23. An apparatus for transmitting power and information, comprising:
  a receiver configured to receive a pilot signal from another apparatus;
  a signal generator configured to generate an energy transfer signal based on the pilot signal;
  a modulator configured to modulate information into the energy transfer signal by controlling the signal generator generate the energy transfer signal with a peak-to-average power ratio (PAPR) associated with the information; and
  a transmitter configured to transmit the modulated energy transfer signal to the another apparatus,
  wherein, in the modulating of the information, a maximum value of the PAPR is one-to-one mapped to the information, and changes in correspondence with a number of tones that form the energy transfer signal.

24. The apparatus of claim 23, wherein the information comprises digital data.

25. The apparatus of claim 23, further comprising a matcher configured to estimate a channel status based on the pilot signal.

\* \* \* \* \*